3,224,538
CLUTCH UNIT FOR POWER PRESS
William E. Ward, 3645 Warrensville Center Road,
Shaker Heights, Ohio
Filed June 20, 1963, Ser. No. 289,316
6 Claims. (Cl. 192—85)

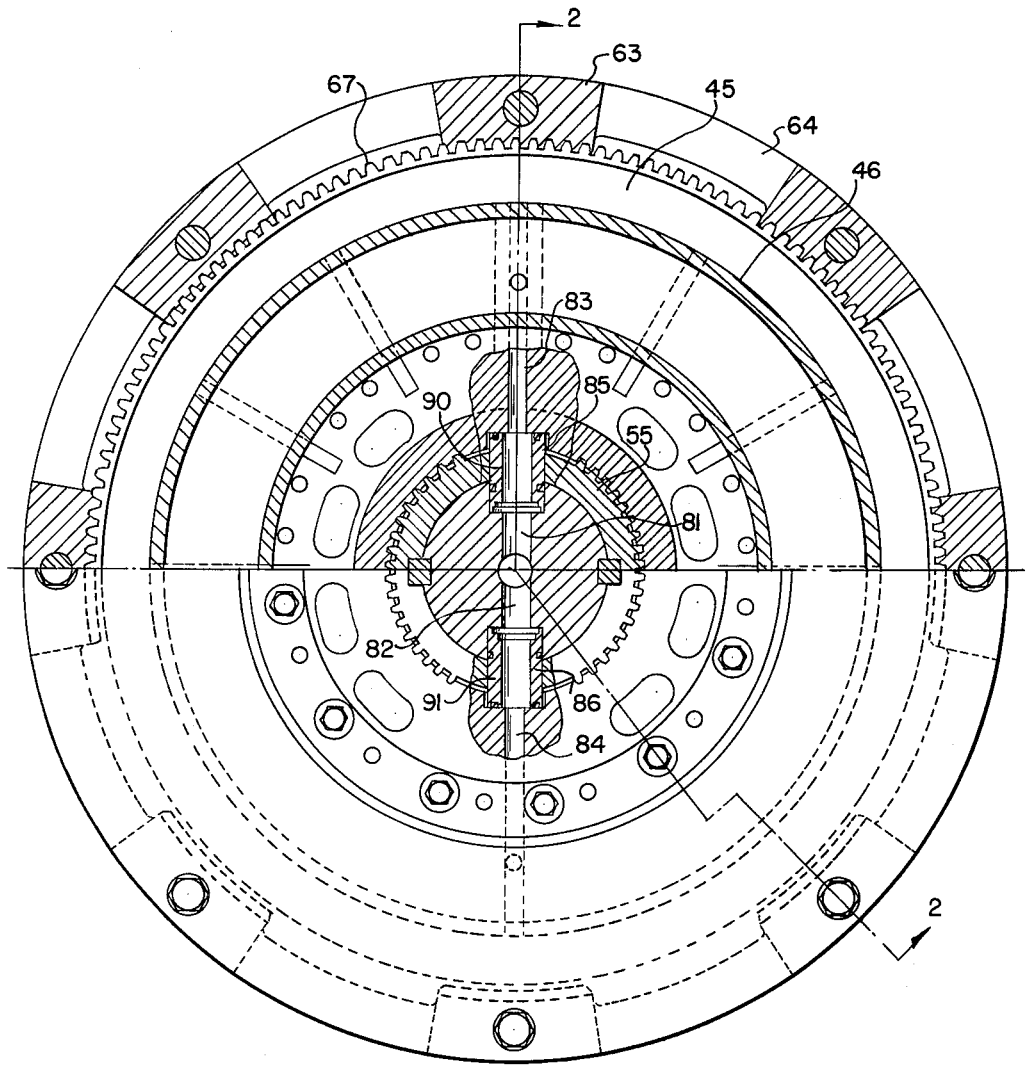
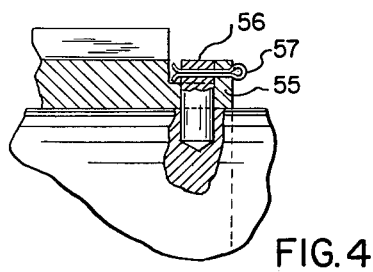
FIG. 3
FIG. 4
INVENTOR.
WILLIAM E. WARD
BY
Hoffmann and Jount
ATTORNEYS United States Patent Office 3,224,538
Patented Dec. 21, 1965

The present invention relates to punch presses and the like and more particularly to presses having driving means including a flywheel journaled on a shaft, a clutch for intermittently drivingly connecting the flywheel to the shaft and preferably including a brake for stopping the shaft when disconnected from the flywheel.

One of the principal objects of the invention is the provision of a new and improved press of the character referred to above, the clutch of which and brake, if the latter is employed, are fluid operated, are simple and durable in construction, have low inertia in that the part or parts subjected to rapid acceleration are of minimum mass, and to which the operating fluid is supplied through a passage or passages in the driven shaft and connected to the clutch and brake by a minimum of sealing members.

Another of the principal objects of the invention is the provision of a new and improved press of the character referred to above, the clutch of which and brake, if the latter is employed, are fluid operated, are simple and durable in construction, have low inertia in that the part or parts subjected to rapid acceleration are of minimum mass, have combination cylinder-piston assemblies both members of which are slidably keyed to hub members fixed to a driven shaft, and to which the operating fluid is supplied through a passage or passages in the driven shaft and connecting passages in the cylinder and hub members and including radially extending tubular members and a minimum of sealing members.

Another of the principal objects of the invention is the provision of a new and improved clutch assembly and/or brake assembly for a press which are simple and durable in construction, easily maintained, have low inertia, and are fluid operated by combination cylinder-piston assemblies both members of which are slidably keyed to hub members adapted to be fixed to a driven shaft and supplied by fluid through conduit means in the driven shaft upon which they are supported and transverse passages in the cylinder and hub members and the driven shaft and including radially movable tubular members located partly in the driven shaft, extending through the hub members and engaging the cylinder members with seals between the sides of the tubular members and the driven shaft and the ends of the tubular members and the cylinder members.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which:

FIG. 3 is a view approximately on the line 3—3 of FIG. 2 with portions broken away to approximately the line 4—4; and FIG. 4 is a fragmentary enlarged view of a portion of FIG. 2.

Figure 1:
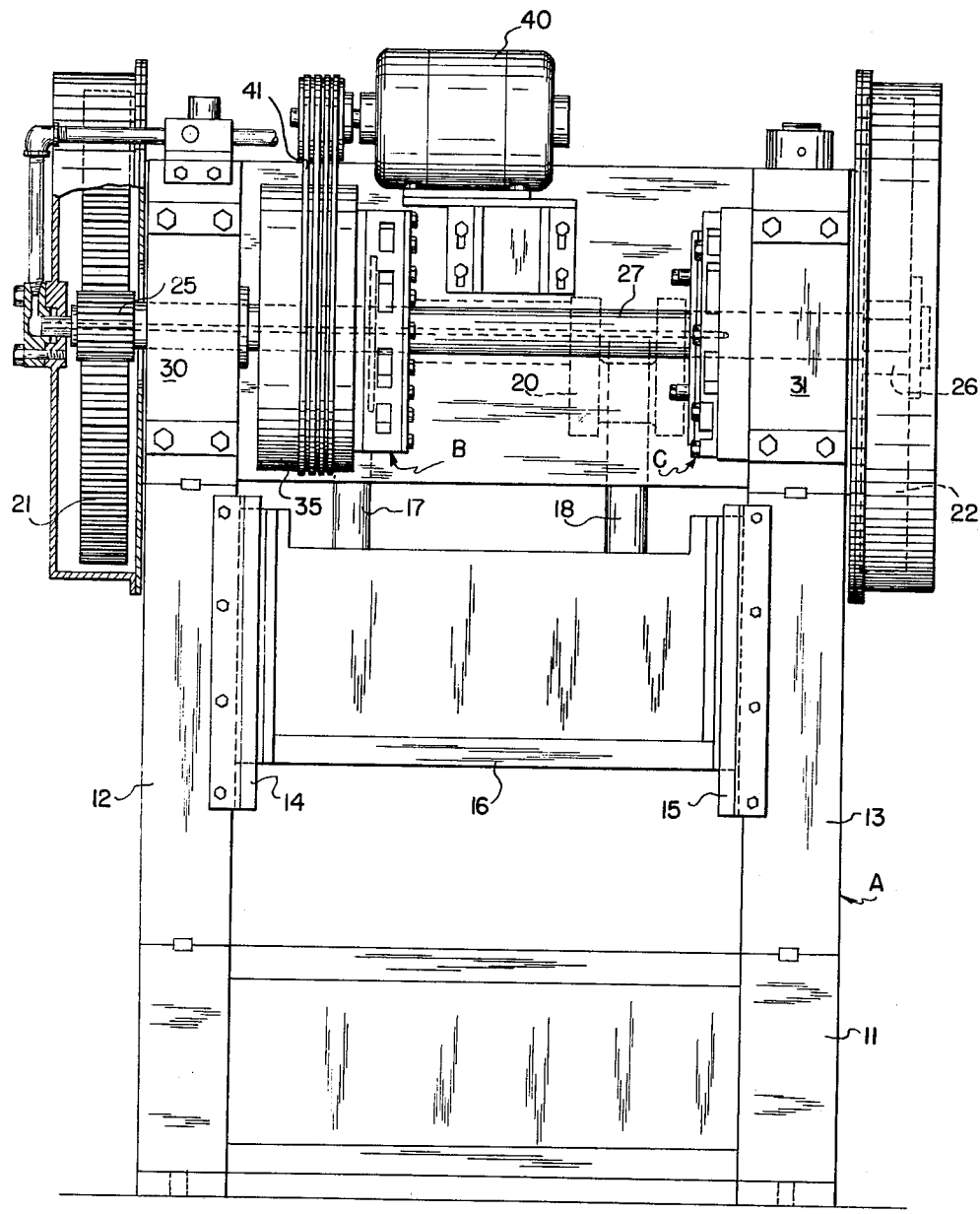
FIG. 1 is a rear elevational view of a punch press embodying the present invention.

Although the invention may be otherwise embodied, it is herein shown and described as incorporated in a punch press comprising a frame A including a bed 11 having uprights 12 and 13 at opposite sides. The uprights 12 and 13 have guideways 14, 15, attached thereto which guide a ram 16 for movement in a vertical direction toward and from the bed 11. The ram 16 is reciprocated by pitmans 17 and 18 attached to suitable cranks on a crank shaft 20 journaled in the upper part of the frame A and driven through two bull gears 21 and 22 attached to opposite ends thereof, which bull gears are in turn driven by pinions 25 and 26, respectively, secured to opposite ends of a driven shaft 27 rotatably supported in the frame A by suitable bearings 30 and 31.

Figure 2:
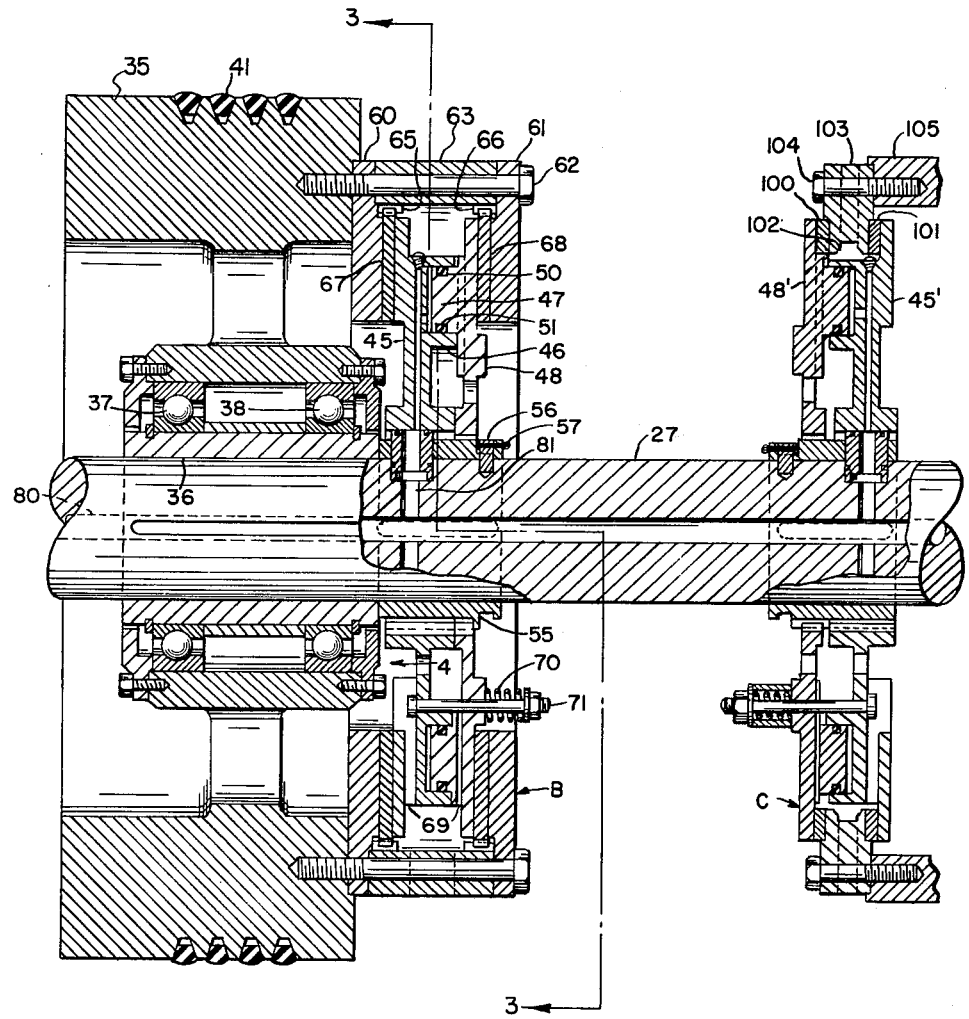
FIG. 2 is a sectional view with portions in elevation through the clutch approximately on the line 2—2 of FIG. 3.

The driven shaft 27 supports a flywheel 35 intermediate the bearings 30 and 31. The flywheel is journaled by suitable spaced antifriction bearings 37 and 38 upon a sleeve 36, see FIG. 2, keyed to the drive shaft. The flywheel 35, which is freely rotatable on the driven shaft 27, is adapted to be driven by an electric motor 40 supported on the crown portion of the press frame and which motor is connected to the driven shaft 27 by a multiple V belt drive, designated generally by the reference character 41.

The flywheel 35 is adapted to be intermittently connected in driving relation with the shaft 27 by a fluid actuated clutch, designated generally by the reference character B, and which comprises a disk-like cylinder member 45 having an axially extending annular cylinder chamber 46 within which an annular piston 47 of a disk-like piston member 48 is slidably received. The piston portion 47 of the piston member 48 is provided with external grooves within which suitable seals 50, 51 are located. The cylinder and piston members 45, 48 have central openings therethrough and are slidably supported on a sleeve or hub member 55 having spur-type gear teeth on its periphery with which similar gear teeth on the interior of the openings through the cylinder and piston members mesh. The hub or sleeve member 55 is keyed to the driven shaft 27 and is secured thereto against axial movement relative to the shaft by a dowel pin 56 extending through the member 55 and projecting into a suitable aperture in the driven shaft 27. A cotter pin 57 extending through aligned holes in the top of the cotter pin and a flange on the hub member formed by an external groove therein secures the dowel pin 56 to the hub member 55. The construction is such that the cylinder and piston members rotate with the driven shaft 27 but have limited movement axially thereof.

The cylinder and piston members 45, 48 include radial outer peripheral portions which project into what is in effect an internal annular groove or space in the flywheel provided by two ring-like clutch disks or members 60, 61 fixed to the flywheel 35 by a plurality of bolts 62 and held in predetermined spaced relation with respect to one another by a ring-like member 63 having radial apertures 64 therein and two series of spaced internal gear segments 65, 66, see FIG. 3, the teeth of which are in mesh with similar external teeth on the periphery of ring-like friction clutch members or wear plates 67, 68. The members 67, 68 extend inwardly toward the driven shaft 27 between the adjacent sides of members 45, 60 and 48, 61, respectively. The construction is such that the friction clutch plates 67, 68 are caused to rotate with the flywheel 35 but are free to move a limited amount axially of the axis of rotation of the driven shaft 27, etc. The opening 64 through the member 63 permits air to circulate therethrough and through apertures 69 formed in the members 45 and 48.

The cylinder and piston members 45, 48 are resiliently urged or biased toward one another by a plurality of compression springs 70 located on bolts 71 projecting through aligned apertures in the members. The heads of the bolts 71 engage against the left-hand side of the cylinder member 45, as viewed in FIG. 2, and the compression springs 70 are positioned on the right-hand ends of the bolts between the right-hand side of the piston member 48 and washers positioned underneath the nuts of the bolts.

The cylinder and piston members 45, 48 are moved axially of the driven shaft 27, that is, in a direction to expand the cylinder-piston combination and clamp the friction clutch plates 67, 68 therebetween and the clutch rings 60, 61 to engage the clutch and drive the driven shaft 27 from the flywheel 35 by fluid under pressure admitted to the bottom or left-hand end of the cylinder 46 in the cylinder member 45 by conduit means including a longitudinally extending aperture 80 in the driven shaft 27 and transversely extending apertures 81 and 82 communicating therewith, see FIG. 3. The apertures 81 and 82 are connected to radially extending apertures 83, 84 in the cylinder member 45 which in turn communicate with the bottom or left-hand end of the cylinder bore 46 in the cylinder member 45.

The sleeve or hub member 55 is provided with cylindrical apertures 85, 86 coaxial with the apertures 81, 82 in the shaft 27 and the shaft is counterbored to the same diameter in line with the apertures 85, 86. The hub of the cylinder member 45 is also slotted axially concentrically with the apertures 83, 84 thereof to a width slightly larger than the diameter of the apertures in the shaft 27 and the hub member 55 and to a depth at least below the spines thereof. The apertures 85, 86 through the hub member 55 and the bores in the shaft 27 and the cylinder member 45 form cylindrical chambers within which cylindrical, tubular members 90, 91 are slidably supported for movement radially of the axis of rotation of the shaft 27.

The radially inner ends of the bores in the shaft 27, as previously stated, communicate with the transverse fluid conduit apertures 81, 82 in the shaft and fluid is prevented from escaping therefrom around the periphery of the members 90, 91 by suitable seals located in circumferential or external apertures in the members 90, 91 adjacent to their radial inner ends and which seals engage the walls of the bores in the shaft 27. Annular grooves are also provided in the radial outer end faces of the members 90, 91 in which suitable seals are located for preventing the escape of fluid between the radial outer ends of the members 90, 91 and the bottoms of the bores in the cylinder members 45 within which they engage. The construction is such that fluid under pressure admitted to the longitudinally extending aperture 80 in the driven shaft 27 is transmitted through the transverse apertures 81, 82 in the shaft, the interior openings through the members 90, 91 and the apertures 83, 84, etc. to the head end of the cylinder 46 of the cylinder member 45.

The members 90, 91 together with the seals carried thereby prevent the escape of fluid between the circumference of the member 55 and the internal diameter of the cylinder member 45 even though the cylinder member 45 has a relatively loose fit on the hub member 55 and is slidable a limited amount lengthwise thereof. When under pressure, the fluid in the radial inner ends of the counterbores in the shaft 27 within which the members 90, 91 are slidably supported maintains the radially outer ends of the members 90, 91 and the seals carried thereby in tight engagement with the bottom surface of the slots in the cylinder member 45 and into which the radially outer ends of the members 90, 91 extend. When the fluid in the conduit means and the cylinder 46 is not under pressure or not under relatively high pressure, the cylinder member 45 is free to slide lengthwise of the axis of the driven shaft 27 without excessive wear.

Preferably, a fluid pressure release brake is provided to brake the driven shaft 27 when the clutch is disengaged. A brake of any suitable construction may be employed. The brake C, shown, is generally similar to the clutch B, already described, with the exception of the fact that when the fluid pressure is released and the cylinder and piston members move toward one another by the springs provided for that purpose the peripheral annular ring formations thereof engage ring-like friction disks interposed therebetween and the radially inner portion of a stationary brake ring member bolted to an annular member forming a part of the press frame. The brake C will not be described in detail. The parts of the brake assembly C, which are duplicates of parts of the clutch assembly B, are designated by the same reference characters with prime marks affixed thereto. The cylinder and piston members 45′, 48′ of the brake B are supported on the shaft 27 in a manner similar to that employed for supporting the corresponding parts of the clutch assembly on the shaft and are moved toward and from one another in a similar manner by pressure fluid, either oil or air, applied thereto through the longitudinally extending apertures 80 in the driven shaft 27.

In the drawings, the cylinder and piston assembly of the brake C are shown positioned on the shaft 27 reversely of the position in which the corresponding assembly of the clutch B is shown positioned on the shaft 27, but it is immaterial in which position either of the assemblies is positioned. The respective positions employed are for the purpose of facilitating access to the means used to fix the hub or sleeve member 55 against axial movement along the shaft 27, which means in the illustrated embodiment is the dowel pins 56 cotterkeyed at their tops to a flange on the hub member 55.

The friction brake disks, referred to, are designated 100, 101 and are interposed between the radially outer portions of the cylinder and piston members 45′, 48′ and the radially inner flange 102 of a brake ring member 103 bolted by bolts 104 to a ring-like member 105 fixed to the frame of the press.

From the construction shown and described, it will be apparent that when fluid under pressure, either air or oil, is applied to the aperture 80 in the shaft 27, the cylinder and piston members of the clutch B will be expanded and the clutch engaged and the piston and cylinder members of the brake B will be expanded and the brake disengaged. To facilitate maintenance of the clutch and brake, for example, replacement of the friction disk members 67, 68 and 100, 101, these parts and the brake ring 103 may be made of a number of segments.

It will be apparent that the objects heretofore described and others have been accomplished and that there has been provided a novel and improved press of the character described having driving means including a flywheel and clutch and brake means for intermittently connecting the flywheel to the drive shaft and stopping the shaft upon disconnection of the flywheel in which the clutch and brake are fluid operated, simple and durable in construction, having low inertia of the moving parts and wherein the operating fluid is supplied through a passage or passages in the driven shaft by a minimum of sealing members.

While the preferred embodiment of the invention has been shown and described in considerable detail, the invention is not limited to the particular construction shown and it is the intention to cover all adaptations, modifications and uses thereof which come within the practice of those skilled in the art to which the invention pertains.

Having thus described my invention, I claim:

1. In a device of the character referred to, a shaft, a first assembly concentric with said shaft and adapted to be selectively connected to said shaft, a second assembly comprising a pair of elements connected with said shaft for limited axial movement relative thereto and relative to each other, said elements projecting radially beyond radially inner portions of said first assembly, fluid actuated motor means connected to said elements of said second assembly for moving the same axially of said shaft, conduit means for supplying fluid to said fluid actuated motor means including a longitudinally extending aperture in said shaft, a transversely extending aperture in said shaft communicating with said first aperture and terminating in a counterbore, a radial aperture in one of said elements of said second assembly radially outwardly of said transversely extending aperture in said shaft and of less diameter than that of said counterbore, a tubular member supported in said counterbore for radial movement therein and communicating with said transversely extending aperture in said drive shaft and said radial aperture in said one element, a circumferential seal carried by said tubular member and the wall of said counterbore, and an end seal between the radially outer end of said tubular member and the radially inner surface of said element of said second assembly in which said radial aperture is formed.

2. In a device of the character referred to, a shaft, a first assembly concentric with said shaft and adapted to be selectively connected to said shaft, a second assembly comprising a pair of elements connected with said shaft for limited axial movement relative thereto and relative to each other, said elements projecting radially beyond radially inner portions of said first assembly, resilient means connected to said elements of said second assembly for moving them axially of said shaft in opposite directions, fluid actuated motor means connected to said elements of said second assembly for moving the same axially of said shaft against the resistance of said resilient means, conduit means for supplying fluid to said fluid actuated motor means including a longitudinally extending aperture in said shaft, a transversely extending aperture in said shaft communicating with said first aperture and terminating in a counterbore, a radial aperture in one of said elements of said second assembly radially outwardly of said transversely extending aperture in said shaft and of less diameter of said counterbore, a tubular member supported in said counterbore for radial movement therein and communicating with said transversely extending aperture in said drive shaft and said radial aperture in said one element, a circumferential seal carried by said tubular member and the wall of said counterbore, and an end seal between the radially outer end of said tubular member and the radially inner surface of said element of said second assembly in which said radial aperture is formed.

3. In a press or the like a shaft, means including a flywheel for driving said shaft, bearing means rotatably supporting said flywheel on said shaft, clutch means concentric with said shaft for selectively connecting said flywheel and said shaft, said clutch means comprising driving clutch elements fixedly connected to said flywheel and spaced axially of one another, driven clutch elements slidably connected with said shaft for limited axial movement relative thereto and for limited axial movement relative to each other, said clutch elements and projecting radially between said driving clutch elements, fluid actuated motor means connected to said driven clutch elements for moving the same axially of said shaft into engagement with said driving clutch elements to drivingly interconnect said flywheel and said shaft, conduit means for supplying fluid to said fluid actuated motor means including a longitudinally extending aperture in said shaft, a transversely extending aperture in said shaft communicating with said first aperture and terminating in a counterbore in its radially outer end, a radial aperture in one of said driven clutch elements outwardly of said transversely extending aperture in said shaft and of less diameter than that of said counterbore, a tubular member supported in said counterbore for radial movement therein and communicating with said transversely extending aperture in said drive shaft and said radial aperture in said clutch element, a circumferential seal carried by said tubular member and the wall of said counterbore, and an end seal between the radially outer end of said tubular member and the radially inner surface of said clutch element in which said radial aperture is formed.

4. In a press or the like, a shaft, means including a flywheel for driving said shaft, bearing means rotatably supporting said flywheel on said shaft, clutch means concentric with said shaft for selectively connecting said flywheel and said shaft, said clutch means comprising driving clutch elements fixedly connected to said flywheel and spaced axially of one another, driven clutch elements slidably connected with said shaft for limited axial movement relative thereto and for limited axial movement relative to each other, said clutch elements and extending radially between said driving clutch elements, resilient means connected to said driven clutch elements for moving the same axially of said shaft toward one another, fluid actuated motor means connected to said driven clutch elements for moving the same axially of said shaft away from one another into engagement with said driving clutch elements to drivingly interconnect said flywheel and said shaft, conduit means for supplying fluid to said fluid actuated motor means including a first aperture in said shaft extending lengthwise thereof, a second aperture in said shaft communicating with said first aperture and extending transversely of said first aperture, said second aperture including a counterbore in its radially outer end terminating in a counterbore, a third aperture in one of said driven clutch elements radially outwardly of said second aperture and of less diameter than that of said counterbore, a tubular member supported in said counterbore for radial movement therein and communicating with said second aperture in said drive shaft and said third aperture in said clutch element, a first seal between said tubular member and the wall of said counterbore, and a second seal between the radially outer end of said tubular member and the radially inner surface of said driven clutch element in which said third aperture is formed.

5. In a device, a shaft having a longitudinally extending conduit therein and a transversely extending conduit communicating with said longitudinally extending conduit and counterbored at its radially outer end, a member connected with said shaft for limited axial movement relative thereto and overlying said counterbore, said member having a radially extending conduit therein surrounded at its radial inner end by a plane surface, a tubular member supported in said counterbore, said plane surface having a dimension axially of said shaft greater than the axial dimension of the outer end of said tubular member, a fluid seal interposed between the circumference of said tubular member and the wall of said counterbore, and a fluid seal interposed between the radially outer end of said tubular member and said plane surface.

6. In a press or the like, a shaft having a longitudinally extending conduit therein and a radially extending conduit therein communicating with said longitudinally extending conduit and counterbored at its radially outer end, a first member keyed to said shaft and having a first radial bore overlying said shaft counterbore and having splines at its outer diameter, said first member having a second radial bore adjacent one end thereof and overlying a radial bore in said shaft, a pin member supported in said last named bores and locked to a radially extending flange at said one end of said first member to prevent axial movement of said first member on said shaft, a second member slidably splined to said first member and having a plane surface, a tubular member supported in said counterbore and said first radial bore with its radially outer end contacting said plane surface of said second member slidably splined to said first member, said plane surface having a dimension axially of said shaft greater than the axial dimension of the outer end of said tubular member, a fluid seal interposed between the circumference of said tubular member and the wall of said shaft counterbore, and a fluid seal interposed between the radially outer end of said tubular member and said plane surface.

References Cited by the Examiner
UNITED STATES PATENTS
3,077,252  2/1963  Treer.

FOREIGN PATENTS
1,335  1/1892  Great Britain.
947,130  8/1956  Germany.

DAVID J. WILLIAMOWSKY, *Primary Examiner.*